March 6, 1928.  1,661,178
C. JOBST
STAMPING OR EMBOSSING MACHINE
Filed June 6, 1923   2 Sheets-Sheet 1
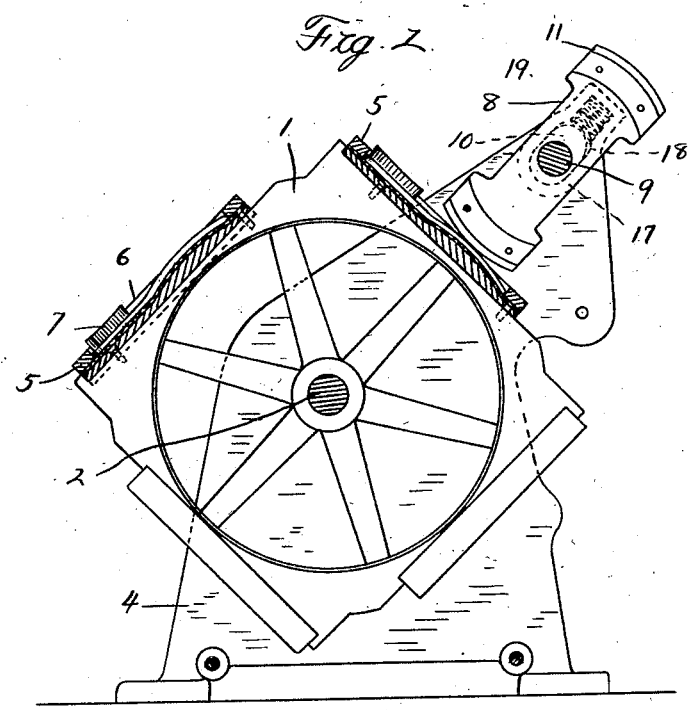
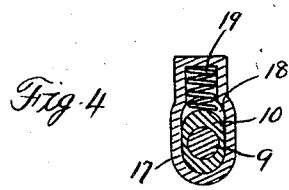
Inventor
Conrad Jobst
Attorneys March 6, 1928. 1,661,178
C. JOBST
STAMPING OR EMBOSSING MACHINE
Filed June 6, 1923 2 Sheets-Sheet 2
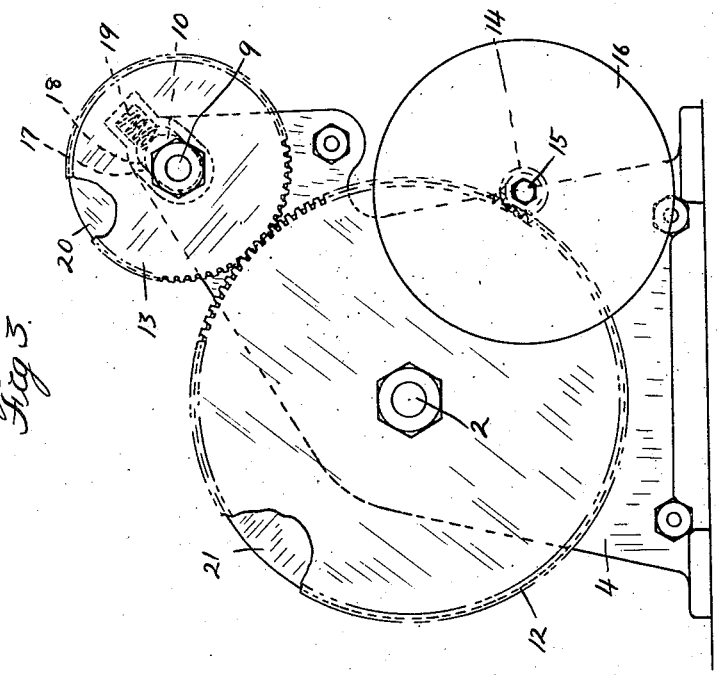
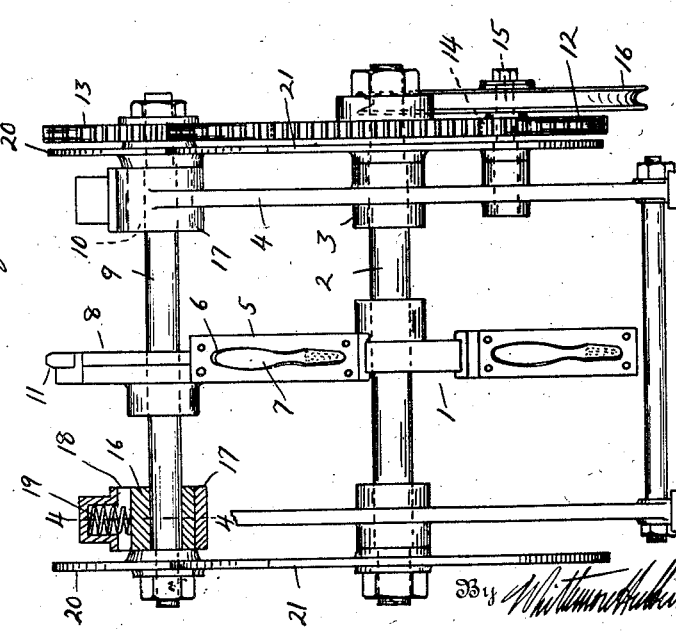
Inventor
Conrad Jobst Patented Mar. 6, 1928.

1,661,178

UNITED STATES PATENT OFFICE.

CONRAD JOBST, OF TOLEDO, OHIO, ASSIGNOR TO THE TOLEDO AUTOMATIC BRUSH MACHINE COMPANY, OF TOLEDO, OHIO, A CORPORATION OF OHIO.

STAMPING OR EMBOSSING MACHINE.

Application filed June 6, 1923. Serial No. 643,683.

The invention relates to a machine for embossing the surface of irregular shaped articles and is more particularly designed to mark the handles of tooth brushes which are usually of irregular curvature.

One of the objects of the invention is to provide a machine of simple construction in which the work pieces may be successively presented to an embossing die whereby a continuous operation may be effected and a large number of articles marked in a short period of time. Another object is to provide a multiple die so arranged that each die contacts with alternate work pieces which are presented, thereby permitting different markings to be placed upon the alternate articles. Other objects of the invention reside in the novel arrangement of the parts which are more fully hereinafter described.

In the drawings:—

Figure 1 is a sectional side elevation of the machine;

Figure 2 is a front elevation of the machine;

Figure 3 is a side elevation showing the driving mechanism;

Figure 4 is a section on line 4—4 of Figure 2.

In general construction my machine consists of a rotatable carrier and a rotatable die which are driven in timed relation to present the work pieces carried by said carrier to a rolling engagement with said die.

As shown specifically in the drawings, 1 represents the rotatable carrier mounted upon a shaft 2 journaled in bearings 3 in a suitable frame 4. Supported on the periphery of the carrier are a plurality of work holders 5, each of which contains a recess 6 of a suitable contour to receive a tooth brush 7 or other work to be embossed. The bottom of the recess is preferably so formed as to be complementary to the curvature of the back of the tooth brush thereby forming a substantial support for the same.

A die member 8, mounted upon a shaft 9 parallel to the shaft 2 and supported in bearings 10 in the frame 4, carries upon its periphery one or more dies 11 having a contour such as to form a rolling engagement with the work piece 7 when the carrier and die member are rotated in timed relation.

12 is a gear upon the shaft 2 which meshes with a gear 13 upon the shaft 9, these two gears being of such sizes as to compel the carrier and die member to rotate in a timed relation and cause the engagement of the successive work pieces with the successive dies. Preferably, the gears are provided with a certain amount of back lash to allow for a true rolling engagement of the work and die. A pinion 14 is secured to a countershaft 15 and meshes with the gear 12 and a suitable driving connection 16 is also secured to the shaft 15 which may be rotated by any suitable driving means.

The shaft 9 is preferably arranged to be yieldingly adjustable with respect to the shaft 2 and for this purpose the bearings 10 are slidably arranged in the brackets 17 provided with guideways 18 arranged parallel to the plane of the shafts 2 and 9. Springs 19 yieldingly hold the bearings 10 in the inner position of adjustment, in which position the disks 20 upon the shaft 9 contact with the disks 21 on the shaft 2.

In the operation, the carrier is continuously rotated in the direction of the arrow and as a work holder enters upon the upper half of its cycle, the operator inserts a tooth brush therein which is retained in place by gravity. As the carrier continues its rotation, the handle of the brush is presented to one of the dies 11 which is caused to roll upon the face of the handle, thereby embossing the handle with suitable marking. It will be noted that the die member 8 is cut away to avoid interference with the bristles on the brush and with the corners of the work holder and that the next succeeding work holder upon the carrier engages with the opposite die 11. As soon as the brush back has passed out of engagement with the die 11 it falls from the work holder by gravity. The yielding movement of the shaft 9 insures the proper pressure upon the die member to effect the embossing operation and also compensates for any irregularities in the contour of the handles. In order to obtain a true rolling engagement of the work and die, it is necessary that a certain amount of back lash be provided in the gearing to compensate for the irregular surface contour of the brush back.

What I claim as my invention is:—

1. A machine of the class described comprising a rotatable carrier having a plurality of tangentially arranged work holders on the periphery thereof, each arranged to support an article with its lengthwise axis tangent to the circle of rotation, a rotatable member provided with a segmental die having a rigid working surface, means for rotating said carrier and member in timed relation to cause said die to roll upon the work in successive work holders, and means allowing a relative yielding between said die and the work when in engagement.

2. A machine of the class described comprising a rotatable carrier having a plurality of work holders on the periphery thereof, a rotatable member provided with a plurality of segmental dies, each die having a rigid working surface of arcuate form conjugate to the surface of the work in said holders, means for rotating said carrier in timed relation to cause the work in successive work holders to roll in contact with successive dies.

3. A machine of the class described comprising a pair of rotatable parallel shafts, one being transversely yieldable with respect to the other, a carrier mounted on one of said shafts having a polygonal periphery containing recesses for receiving the work to be embossed, a segmental die mounted upon the other shaft having a rigid surface conjugate to the surface of the work, means for rotating one of said shafts, gearing for rotating the other shaft in timed relation to the first mentioned shaft to cause a rolling engagement of the die and the work.

4. A machine of the class described comprising a carrier rotatable about a horizontal axis and provided with a plurality of recesses arranged around the periphery, each of said recesses being adapted to receive a tooth brush or similar article and to support the same so that its lengthwise axis is tangent to the circle of rotation, and a segmental die rotatable about a parallel axis in timed relation to said carrier, said die having a working surface conjugate to the surface of the portion of the handle to be embossed whereby a rolling engagement of said die and work is obtained.

5. A machine of the class described comprising a rotatable carrier, means for supporting a tooth brush handle on the periphery of said carrier so that its lengthwise axis is tangent to the circle of rotation, a rotatable die having a rigid curved surface provided with embossing characters thereon, and means for rotating said carrier and said die in timed relation whereby the curved surface of said die is caused to roll longitudinally along the surface of said handle.

6. A machine of the class described comprising a frame, parallel shafts suported on said frame, a rotatable carrier on one shaft, a rotatable member on the other, resilient means for permitting a lateral movement of one shaft relative to the other, a work holder on said carrier arranged to support an article of greater length than breadth with its lengthwise axis tangent to the circle of rotation and a rigid die on the periphery of said rotatable member having its working surface curved to a form conjugate with the surface of said article, whereby a rolling engagement is obtained between said die and a considerable length of said article.

In testimony whereof I affix my signature.

CONRAD JOBST.